United States Patent
Lim et al.

(10) Patent No.: US 10,191,479 B2
(45) Date of Patent: Jan. 29, 2019

(54) METHODS AND SYSTEMS FOR NETWORK-BASED DETECTION OF COMPONENT WEAR

(71) Applicant: General Electric Company, Schenectady, NY (US)

(72) Inventors: Ser Nam Lim, Niskayuna, NY (US); David Scott Diwinsky, Mechanicville, NY (US); Russell Robert Irving, Ballston Lake, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 570 days.

(21) Appl. No.: 14/868,856

(22) Filed: Sep. 29, 2015

(65) Prior Publication Data

US 2017/0090458 A1     Mar. 30, 2017

(51) Int. Cl.
    *G05B 19/40*          (2006.01)
    *G05B 23/02*          (2006.01)
    (Continued)

(52) U.S. Cl.
    CPC ....... *G05B 23/0232* (2013.01); *G05B 19/406* (2013.01); *G05B 19/4065* (2013.01); *G05B 2219/50276* (2013.01)

(58) Field of Classification Search
    CPC ........ G05B 2219/50276; G05B 19/406; G05B 19/4065
(Continued)

(56) References Cited

U.S. PATENT DOCUMENTS

| 4,968,892 A | 11/1990 | McAtee |
| 5,581,486 A * | 12/1996 | Terada ..................... G07C 3/00 700/174 |

(Continued)

FOREIGN PATENT DOCUMENTS

| CN | 202471613 U | 10/2012 | |
| CN | 102866201 B | * 10/2014 | ............. G01N 29/04 |
| CN | 102866201 B | 10/2014 | |

OTHER PUBLICATIONS

Machine translation, Wang, Chinese Pat. Pub. No. CN 102866201, translation date: Feb. 13, 2018, Espacenet, all pages.*

(Continued)

*Primary Examiner* — Victoria K Hall
(74) *Attorney, Agent, or Firm* — GE Global Patent Operation; Nitin Joshi

(57) ABSTRACT

A monitoring system for monitoring a plurality of components is provided. The monitoring system includes a plurality of client systems. The plurality of client systems is configured to generate a plurality of component status reports. The plurality of component status reports is associated with the plurality of components. The monitoring system also includes a component wear monitoring (CWM) computer device configured to receive the plurality of component status reports from the plurality of client systems, generate component status information based on a plurality of component status reports, aggregate the component status information to identify a plurality of images associated with a first component, and compare the plurality of images associated with the first component. The plurality of images represents the first component at different points in time. The CWM computer device is also configured to determine a state of the first component based on the comparison.

26 Claims, 8 Drawing Sheets

(51) Int. Cl.
*G05B 19/4065* (2006.01)
*G05B 19/406* (2006.01)

(58) Field of Classification Search
USPC .................................................. 700/174, 175
See application file for complete search history.

(56) References Cited

U.S. PATENT DOCUMENTS

| | | | | |
|---|---|---|---|---|
| 6,189,384 | B1* | 2/2001 | Piety | G01H 1/003 73/592 |
| 6,246,787 | B1* | 6/2001 | Hennessey | G01N 21/95607 250/559.45 |
| 6,260,427 | B1* | 7/2001 | Jones | G01N 3/58 73/865.9 |
| 6,490,543 | B1* | 12/2002 | Jaw | G05B 19/4065 340/457.4 |
| 6,505,143 | B1* | 1/2003 | Lakshminarasimha | G05B 19/4065 702/183 |
| 6,564,171 | B1* | 5/2003 | Peterson | G05B 19/4065 235/379 |
| 6,584,415 | B1* | 6/2003 | Uneme | G05B 19/4065 702/33 |
| 6,785,586 | B1* | 8/2004 | Toprac | G05B 19/4065 700/110 |
| 6,804,619 | B1* | 10/2004 | Chong | G05B 19/4065 700/108 |
| 6,970,762 | B1* | 11/2005 | Elliott | G05B 19/406 700/174 |
| 8,433,475 | B2 | 4/2013 | Corbefin | |
| 8,442,702 | B2 | 5/2013 | Geiter | |
| 8,781,210 | B2 | 7/2014 | Scheid et al. | |
| 8,833,169 | B2 | 9/2014 | Lute et al. | |
| 9,747,683 | B2* | 8/2017 | Subramaniyan | G06T 7/001 |
| 9,762,015 | B2* | 9/2017 | Steinbach | H01R 39/58 |
| 2003/0163286 | A1* | 8/2003 | Yasugi | G05B 19/4065 702/185 |
| 2005/0171733 | A1* | 8/2005 | Hough | G01B 21/04 702/182 |
| 2005/0211549 | A1* | 9/2005 | Chang | C23C 14/3407 204/192.13 |
| 2007/0203656 | A1* | 8/2007 | Sheahan, Jr. | G05B 19/4065 702/34 |
| 2008/0234994 | A1* | 9/2008 | Goebel | G06F 17/5009 703/7 |
| 2010/0203339 | A1* | 8/2010 | Eryilmaz | A61L 27/08 428/408 |
| 2012/0057174 | A1* | 3/2012 | Briggs | G01C 15/002 356/603 |
| 2013/0113915 | A1* | 5/2013 | Scheid | F01D 17/02 348/82 |
| 2013/0114879 | A1* | 5/2013 | Scheid | G06T 7/001 382/145 |
| 2014/0039808 | A1* | 2/2014 | Shibata | B29C 45/60 702/34 |
| 2014/0303832 | A1* | 10/2014 | Skertic | B64D 45/00 701/29.6 |
| 2015/0009331 | A1* | 1/2015 | Venkatraman | B61L 23/041 348/148 |
| 2015/0149027 | A1* | 5/2015 | Paulsen | G01N 3/56 701/29.4 |
| 2015/0303533 | A1* | 10/2015 | Osaka | G01R 31/3651 429/90 |

OTHER PUBLICATIONS

Machine translation, Jiao, Chinese Pat. Pub. No. CN 202471613, translation date: Feb. 13, 2018, Espacenet, all pages.*
English translation, Wang, Chinese Pat. Pub. No. CN 102866201A, translation date: Feb. 2018, Phoenix Translations, all pages.*
Kinard et al.,"The Digital Thread—Key to F-35 Joint Strike Fighter Affordability", Sep. 1, 2010.
Graham Warwick,"USAF Selects Lead Programs for 'Digital Twin' Initiative", Jan. 26, 2015.

* cited by examiner

METHODS AND SYSTEMS FOR NETWORK-BASED DETECTION OF COMPONENT WEAR

BACKGROUND

The field relates generally to detecting component wear, and more specifically, to a methods and systems for determining component status and potential component wear trends.

Components and subassemblies of industrial machines and devices are repeatedly inspected for wear and potential defects. These inspections may occur in a shop, where the component is removed from the device, or the inspection may occur on-site, where the component is inspected while still attached or coupled to the device or a section of the device. Based on the inspection, the component may be replaced or it may remain a part of the device. Inspections typically determine the state of the component and refer to the physical and material condition of the component. The state of the component includes, but is not limited to, indications of accelerated wear, corrosion, and deformities. Examples of deformities include, but are not limited to, surface burrs and other irregularities.

For the purposes of this application, the term inspection includes inspections of both mobile and non-mobile devices. For example, the device can be an aircraft engine, locomotive, or a non-mobile power turbine. For mobile components, such as those included in aircraft engines, the inspections may occur in different locations. For example, one inspection may take place at an airport in one country or state, while the next inspection occurs at an airport in a second country or state. These two inspections are generally performed independently, where those conducting the inspection may be unaware of any details about the other inspections. Inspections may also be performed by different inspectors with different experiences, who may come to different conclusions about the same component. If an inspection results in the component being replaced, and that component had remaining useful life, then the total cost of operation of the device is increased. Additionally, inspections cost money, both with regard to downtime of the inspected part and the inspection costs themselves.

For both mobile and non-mobile components, generally information about inspections that are kept by the inspecting facility. Furthermore, these inspections are typically not standardized or shared. Therefore, if a particular component type or model develops a flaw, it is difficult for the manufacturer to determine if the flaw is widespread.

BRIEF DESCRIPTION

In one aspect, a monitoring system for monitoring a plurality of components is provided. The monitoring system includes a plurality of client systems. Each client system of the plurality of client systems is associated with at least one imaging device. The plurality of client systems is configured to generate a plurality of component status reports. The plurality of component status reports is associated with the plurality of components, each component of the plurality of components is associated with a unique component identifier, and each of the plurality of component status reports includes the corresponding component identifier and at least one image of the corresponding component. The monitoring system also includes a component wear monitoring ("CWM") computer device in communication with the plurality of client systems. The CWM computer device includes a memory. The CWM computer device is configured to receive a plurality of component status reports from the plurality of client systems, generate component status information based on a plurality of component status reports, aggregate the component status information to identify a plurality of images included in the component status information and associated with a first component of the plurality of components based at least in part on the component identifier associated with the first component, and compare the plurality of images associated with the first component. The plurality of images represents the first component at different points in time. The CWM computer device is also configured to determine a state of the first component based at least in part on the comparison and output the determined state of the first component to a user.

In another aspect, a component wear monitoring ("CWM") computer device is provided. The CWM computer device includes a processor and at least one memory device. The processor is in communication with the at least one memory device. The CWM computer device is configured to receive a plurality of component status reports from a plurality of client systems. The plurality of component status reports is associated with the plurality of components. Each component of the plurality of components is associated with a unique component identifier, and each of the plurality of component status reports includes the corresponding component identifier and at least one image of the corresponding component. The CWM computer device is also configured to generate component status information based on a plurality of component status reports, aggregate the component status information to identify a plurality of images included in the component status information and associated with a first component of the plurality of components based at least in part on the component identifier associated with the first component, compare the plurality of images associated with the first component. The plurality of images represents the first component at different points in time. The CWM computer device is further configured to determine a state of the first component based at least in part on the comparison and output the determined state of the first component to a user.

In yet another aspect, a method for detecting component wear is provided. The method is implemented using a component wear monitoring ("CWM") computer device including a processor and at least one memory device. The method includes receiving a plurality of component status reports from a plurality of client systems. The plurality of component status reports is associated with a plurality of components. Each component of the plurality of components is associated with a unique component identifier and each of the plurality of component status reports includes the corresponding component identifier and at least one image of the corresponding component. The method also includes generating component status information based on a plurality of component status reports, aggregating, by the CWM computer device, the component status information to identify a plurality of images included in the component status information and associated with a first component of the plurality of components based at least in part on the component identifier associated with the first component, and comparing, by the CWM computer device, the plurality of images associated with the first component. The plurality of images represents the first component at different points in time. The method further includes determining, by the CWM computer device, a state of the first component based at least in part on the comparison and outputting the determined state of the first component to a user.

DRAWINGS

These and other features, aspects, and advantages of the present disclosure will become better understood when the following detailed description is read with reference to the accompanying drawings in which like characters represent like parts throughout the drawings, wherein.

Figure 1:
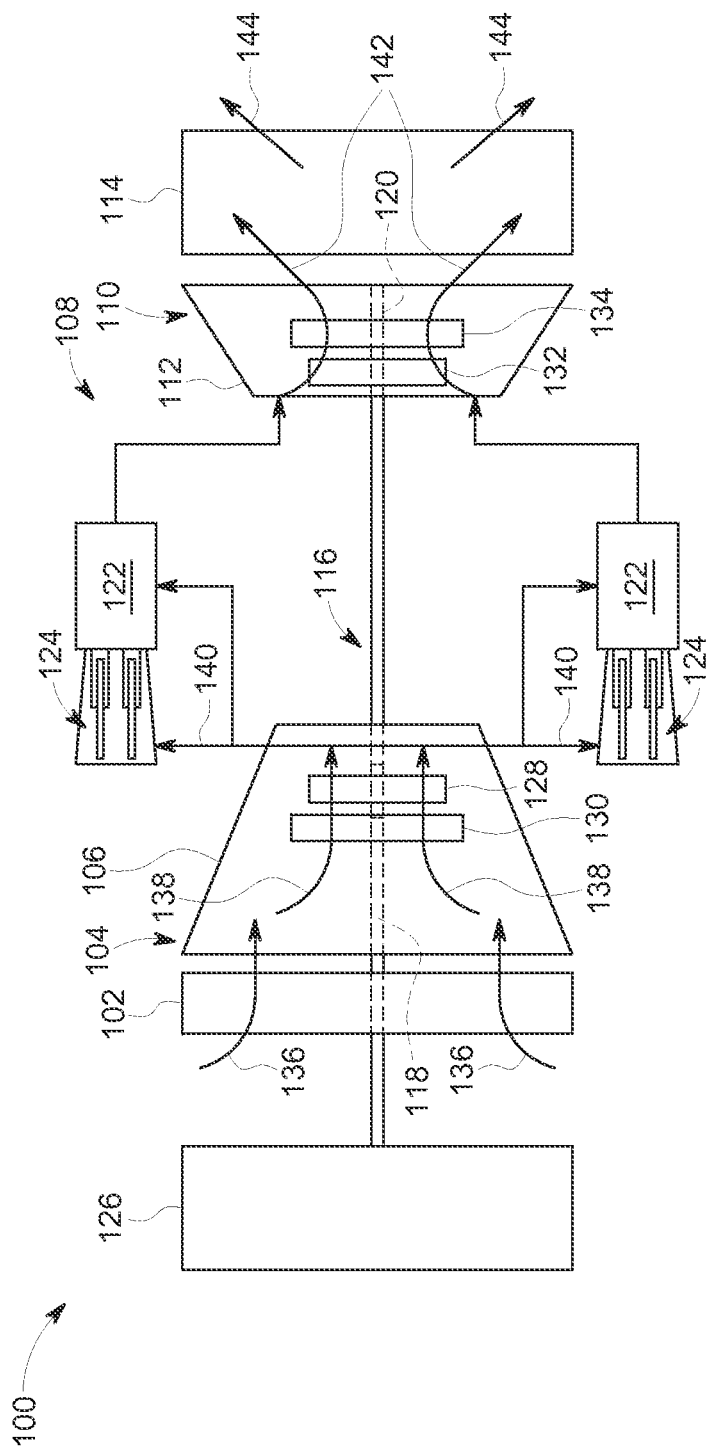
FIG. 1 is a schematic view of a high-value asset, i.e., a turbomachine, and more specifically, in the exemplary embodiment, a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The monitoring method and systems described herein provide for accurate prediction of the lifetime of components. Furthermore, the method and systems described herein allow for and accurate prediction of potential failure points of those components. Also, the system and methods described herein are not limited to any single predefined component, but may be implemented with any component of a device that is subject to wear. For example, the method and systems described herein may be used with wearable components of aircraft, wind turbines, locomotives, power systems, automobiles, and other devices where components are subject to wear. By aggregating the data about the lifecycle of a plurality of components of the same type operating lifetimes and maintenance schedules are more accurately generated.

FIG. 1 is a schematic view of a high-value asset, i.e., a turbomachine, and more specifically, in the exemplary embodiment, a turbine engine 100. Alternatively, any apparatus, system, and facility subject to maintenance and with components subject to wear may be monitored and subject to inspection using a system substantially similar to the measuring system (not shown in FIG. 1) as described herein, including, without limitation, combustion systems such as furnaces, gasification systems, boilers, turbines, geared devices, and high-temperature exhaust systems.

In the exemplary embodiment, gas turbine engine 100 includes an air intake section 102, and a compressor section 104 coupled downstream from, and in flow communication with, intake section 102. Compressor section 104 is enclosed within a compressor casing 106. A combustor section 108 is coupled downstream from, and in flow communication with, compressor section 104, and a turbine section 110 is coupled downstream from, and in flow communication with, combustor section 108. Gas turbine engine 100 is enclosed within a turbine casing 112 and includes an exhaust section 114 downstream from turbine section 110. Moreover, in the exemplary embodiment, turbine section 110 is coupled to compressor section 104 via a rotor assembly 116 that includes, without limitation, a compressor rotor, or drive shaft 118 and a turbine rotor, or drive shaft 120.

In the exemplary embodiment, combustor section 108 includes a plurality of combustor assemblies, i.e., combustors 122 that are each coupled in flow communication with compressor section 104. Combustor section 108 also includes at least one fuel nozzle assembly 124. Each combustor 122 is in flow communication with at least one fuel nozzle assembly 124. Moreover, in the exemplary embodiment, turbine section 110 and compressor section 104 are rotatably coupled to a load 126 via drive shaft 118. For example, load 126 may include, without limitation, an electrical generator or a mechanical drive application, e.g., a pump. Alternatively, gas turbine engine 100 may be an aircraft engine. In the exemplary embodiment, compressor section 104 includes at least one compressor blade assembly 128, i.e., blade 128 and at least one adjacent stationary vane assembly 130.

Also, in the exemplary embodiment, turbine section 110 includes at least one turbine blade assembly, i.e., bucket 132 and at least one adjacent stationary nozzle assembly 134. Each compressor blade assembly 128 and each turbine bucket 132 are coupled to rotor assembly 116, or, more specifically, compressor drive shaft 118 and turbine drive shaft 120.

In operation, air intake section 102 channels air 136 towards compressor section 104. Compressor section 104 compresses inlet air 136 to higher pressures and temperatures prior to discharging compressed air 138 towards combustor section 108. Compressed air 140 is channeled to fuel nozzle assembly 124, mixed with fuel (not shown), and burned within each combustor 122 to generate combustion gases 142 that are channeled downstream towards turbine section 110. Combustion gases 142 generated within combustors 122 are channeled downstream towards turbine section 110. After impinging turbine bucket 132, thermal energy is converted to mechanical rotational energy that is used to drive rotor assembly 116. Turbine section 110 drives compressor section 104 and load 126 via drive shafts 118 and 120, and exhaust gases 144 are discharged through exhaust section 114 to ambient atmosphere.

Figure 2:
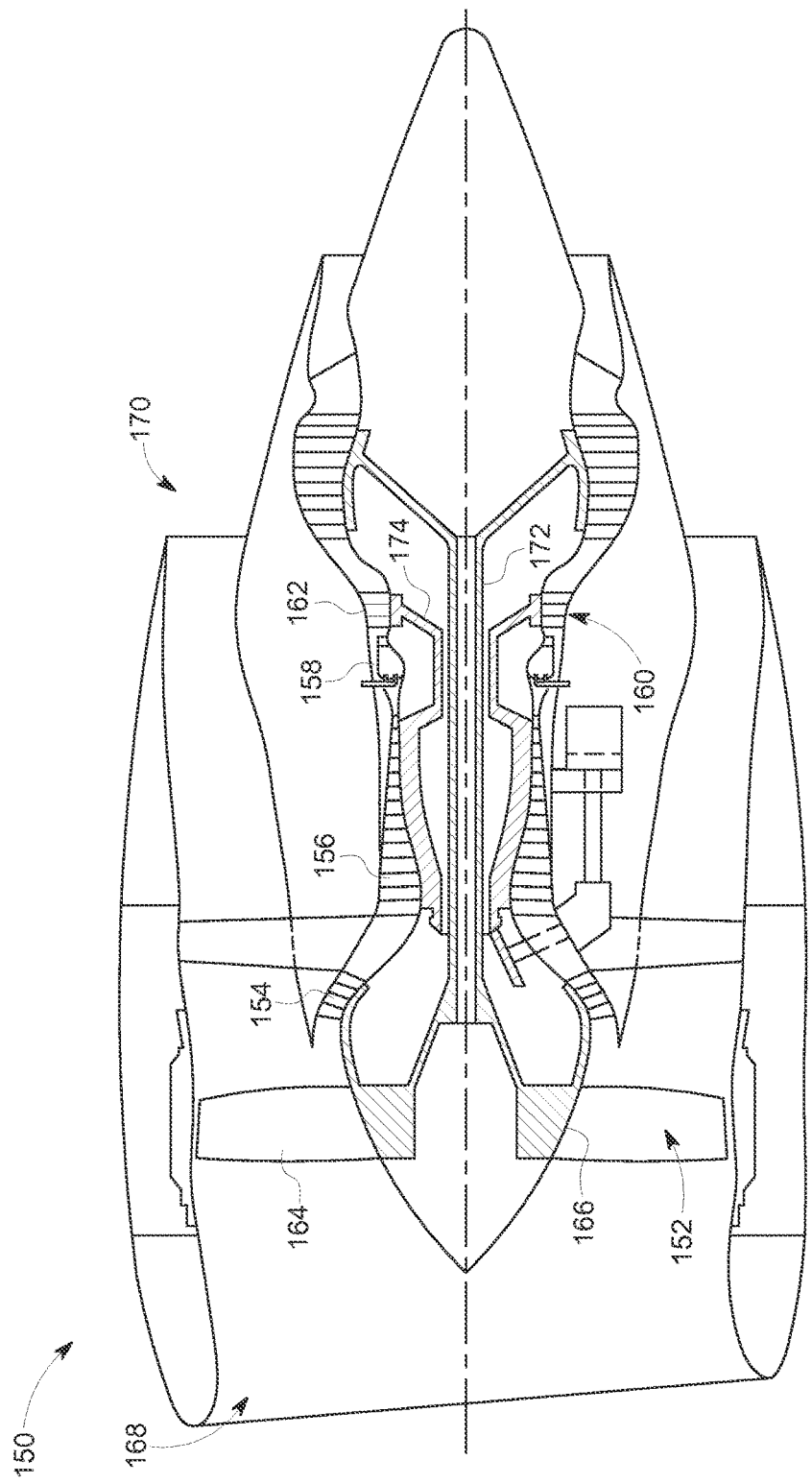
FIG. 2 is a schematic illustration of an exemplary gas turbine engine, and more specifically, in an embodiment, a jet turbine engine.

FIG. 2 is a schematic illustration of an exemplary gas turbine engine, and more specifically, in an embodiment, a jet turbine engine 150. In the exemplary embodiment, jet turbine engine 150 includes a fan assembly 152, a booster 154, a high pressure compressor 156, and a combustor 158. Jet turbine engine 150 also includes a high pressure turbine 160, and a low pressure turbine 162, all in serial flow arrangement. Fan assembly 152 includes an array of fan blades 164 extending radially outward from a rotor disk 166. Engine 150 also includes an intake side 168 and an exhaust side 170. In the exemplary embodiment, engine 150 may be, but is not limited to being, a LEAP or P20 gas turbine engine available from General Electric Company, Cincinnati, Ohio. Fan assembly 152, booster 154, and turbine 162 may be coupled by a first rotor shaft 172, and the compressor 156 and turbine 160 may be coupled by a second rotor shaft 174.

In operation, air flows through fan assembly 152 and compressed air is supplied to high pressure compressor 156 through booster 154. The highly compressed air is delivered to combustor 158, where it is mixed with a fuel and ignited to generate combustion gases. The combustion gases are channeled from the combustor 158 to drive the turbines 160 and 162. The turbine 162 drives the fan assembly 152 and booster 154 by way of shaft 172. The turbine 160 drives the compressor 156 by way of shaft 174. In at least one embodiment, the plurality of components includes blade 164.

FIGS. 1 and 2 are described for illustrative purposes to illustrate devices that are subject to maintenance with components that are subject to wear. Turbine engine 100 and jet turbine engine 150 both include a plurality of components that are subject to wear and may require replacement. For example, compressor blade assembly 128 and turbine bucket 132 in turbine engine 100 and blade 164 in jet turbine engine 150 are non-limiting examples of components that are subject to wear and require inspections to ensure proper operation of the associated device. In the exemplary embodiment, the determination of whether or not to replace one or more components is made in view of at least one inspection of the component in question. As will be described further in this disclosure, comparing the results of a plurality of inspections of the same component will, at least, increase the accuracy of the subsequent inspections. For example, if a comparison between the latest inspection and the previous inspection shows an extraordinary amount of wear, then the inspector may be able to determine that there are additional issues with the device.

Figure 3:
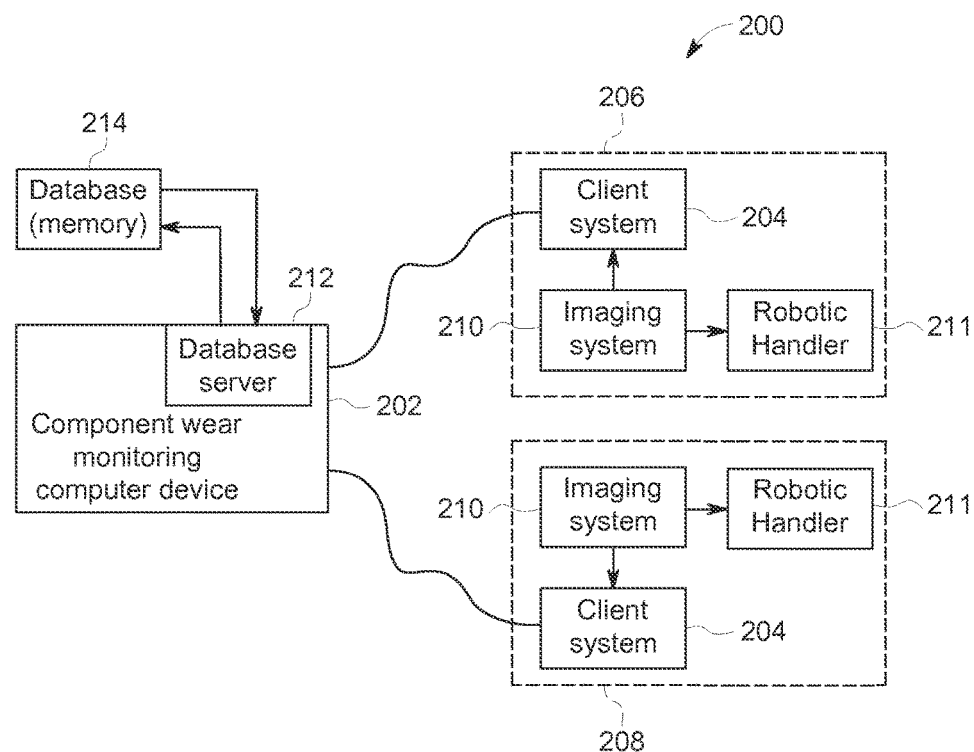
FIG. 3 is a schematic view of an exemplary monitoring system to determine component status and potential component wear trends based on historical component wear patterns for a component of a device, such as the gas turbine engine shown in FIG. 1 and the jet turbine engine shown in FIG. 2.

FIG. 3 is a schematic view of an exemplary monitoring system 200 to determine component status and potential component wear trends. In one example, the system uses historical component wear patterns for a component of a device, such as gas turbine engine 100 (shown in FIG. 1) and jet turbine engine 150 (shown in FIG. 2). In some embodiments, the device is a stationary engine such as gas turbine engine 100 and the components include components such as compressor blade assembly 128 and turbine bucket 132 (both shown in FIG. 1)). In other embodiments, the device is an aircraft engine such as jet engine 150 and the components include aircraft components such as fan blades 164 (shown in FIG. 2).

In the exemplary embodiment, system 200 is used for compiling and responding to component status information from a plurality of client systems 204, where the component status information is associated with a plurality of components. Monitoring system 200 includes a component wear monitoring ("CWM") computing device 202 configured to determine trends of component wear and determine a status of a component. As described below in more detail, CWM computing device 202 is configured to generate component status information based on a plurality of component status reports from a plurality of client systems 204, wherein each component status report includes a component identifier and at least one image of a component associated with the component identifier, and wherein the component status information includes component status reports for a plurality of components, aggregate the component status information to identify a plurality of images associated with a first component based at least in part on the component identifier, compare the plurality of images associated with the first component, wherein the plurality of images represent the first component at different points in time, determine a state of the first component based at least in part on the comparison, and output the determined state to a user.

In some embodiments, CWM computer device 202 is further configured to identify a plurality of subsets of images based at least in part on the component identifier, wherein each subset of images of the plurality of subsets of images associated with a component of a subset of components, compare each subset of images to determine a state for the corresponding component, determine at least one trend based at least in part on the plurality of states associated with the subset of components, and output the determined at least one trend to the user.

CWM computer device 202 is in communication with a plurality of client system 204. Some client systems 204 are a part of in-shop inspection locations 206. Other client systems 204 are a part of on-site inspection locations 208. Each client system 204 is in communication with one or more imaging systems 210.

In the example embodiment, client systems 204 are computers or computer devices that include a web browser or a software application, which enables client systems 204 to access CWM computer device 202 using the Internet. More specifically, client systems 204 are communicatively coupled to the Internet through various wired and wireless interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 204 can be any device capable of accessing the Internet including, but not limited to, a desktop computer, a laptop computer, a personal digital assistant (PDA), a cellular phone, a smartphone, a tablet, or other web-based connectable equipment.

Imaging systems 210 provide images of components to associated client system 204. Imaging systems 210 are imaging devices capable of generating a photographic image, an ultrasound image, a 3D scan, an X-ray image, a video, or any other type of image that allows CWM computer device 202 to perform the steps as described herein. In some embodiments, imaging systems 210 are stationary, such as at in-shop inspection locations 206. In other embodiment, imaging systems 210 are mobile, such as at on-site inspection locations 208. For example, one imaging system 210 at an on-site inspection location 208 is a boroscope, which allows a user (not shown) to point imaging system 210 directly at the component to be inspected. In an exemplary embodiment, imaging systems 210 also include a robotic handler 211.

In the exemplary embodiment, robotic handler 211 positions the component relative to imaging system 210 to allow the imaging system 210 to take images of the component at different angles. In addition, robotic handler 211 positions the component to ensure that images are taken at the same angle at different inspections. For example, at an inspection on December $15^{th}$, images are taken of component A at 37° and 65°. At an inspection on May $18^{th}$, robotic handler 211 positions component A so that is images may be taken at 37° and 65°. In the exemplary embodiment, robotic handler 211 includes at least a robotic arm for positioning the component. In some embodiments, robotic handler 211 includes a rotary table for rotating the component. The robotic arm and the rotary table work together to ensure that the entire component is imaged and all regions of the component are imaged at a clear resolution. In some embodiments, robotic handler 211 positions imaging devices and lighting in addition to positioning the component. Robotic handler 211 is available at both in-shop inspection locations 206 and on-site inspection locations 208. Robotic handler 211 ensures the consistency of the images between inspections, so that images from one inspection are comparable to images from a later inspection. This allows comparisons to determine the condition of the component and detect trends over time.

In the exemplary embodiment, imaging system 210 instructs robotic handler 211. For each component, imaging system 210 includes an algorithm to determine how to position the component in relation to the imaging devices and lighting to capture the desired images.

Imaging systems 210 are in communication with CWM computer device 202. Imaging systems 210 connect to CWM computer device 202 through many wired or wireless interfaces including without limitation a network, such as a local area network (LAN) or a wide area network (WAN), dial-in-connections, cable modems, Internet connection, wireless, and special high-speed Integrated Services Digital Network (ISDN) lines.

A database server 212 is coupled to database 214, which contains information on a variety of matters, as described herein in greater detail. In one embodiment, centralized database 214 is stored on CWM computer device 202. In an alternative embodiment, database 214 is stored remotely from CWM computer device 202 and may be non-centralized. In some embodiments, database 214 includes a single database having separated sections or partitions or in other embodiments, database 214 includes multiple databases, each being separate from each other. Database 214 stores component status reports received from multiple client systems 204. In addition, database 214 stores images, component identifiers, component status information, trends, component statuses, and historical data generated as part of collecting data from multiple client systems 204.

Figure 4:
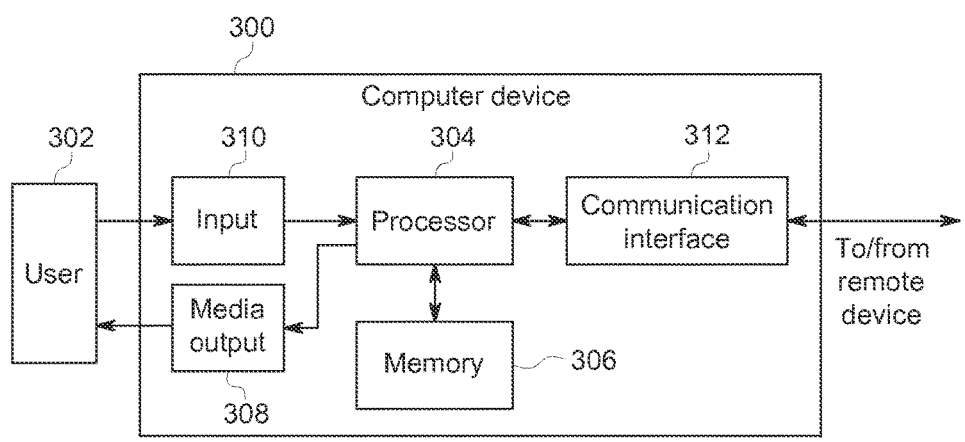
FIG. 4 is a schematic view of an exemplary configuration of a client system that may be used with the monitoring system shown in FIG. 3.

FIG. 4 is a schematic view of an exemplary configuration of a client system 204 that may be used with monitoring system 200 (shown in FIG. 3). Computer device 300 is operated by a user 302. Computer device 300 may include, but is not limited to, CWM computer device 202 (shown in FIG. 3). Computer device 300 includes a processor 304 for executing instructions. In some embodiments, executable instructions are stored in a memory area 306. Processor 304 may include one or more processing units (e.g., in a multi-core configuration). Memory area 306 is any device allowing information such as executable instructions and/or transaction data to be stored and retrieved. Memory area 306 includes one or more computer readable media. In some embodiments, memory area 306 includes database 214 (shown in FIG. 3). In some embodiments, memory area 306 is stored in computer device 300. In alternative embodiments, memory area 306 is stored remotely from computer device 300.

Computer device 300 also includes at least one media output component 308 for presenting information to user 302. Media output component 308 is any component capable of conveying information to user 302. In some embodiments, media output component 308 includes an output adapter (not shown) such as a video adapter and/or an audio adapter. An output adapter is operatively coupled to processor 304 and operatively coupled to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 308 is configured to present a graphical user interface (e.g., a web browser and/or a client application) to user 302. In some embodiments, computer device 300 includes an input device 310 for receiving input from user 302. User 302 may use input device 310 to, without limitation, select a measured attribute to view. Input device 310 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 308 and input device 310.

Computer device 300 may also include a communication interface 312, communicatively coupled to a remote device such as imaging system 210 (shown in FIG. 3). Communication interface 312 may include, for example, a wired or wireless network adapter and/or a wireless data transceiver for use with a mobile telecommunications network.

Stored in memory area 306 are, for example, computer readable instructions for providing a user interface to user 302 via media output component 308 and, optionally, receiving and processing input from input device 310. A user interface may include, among other possibilities, a web browser and/or a client application. Web browsers enable users, such as user 302, to display and interact with media and other information typically embedded on a web page or a website from CWM computer device 202. A client application allows user 302 to interact with, for example, CWM computer device 202. For example, instructions may be stored by a cloud service, and the output of the execution of the instructions sent to the media output component 308.

Processor 304 executes computer-executable instructions for implementing aspects of the disclosure. In some embodiments, processor 304 is transformed into a special purpose microprocessor by executing computer-executable instructions or by otherwise being programmed. For example, processor 304 is programmed with instructions discussed further below.

Figure 5:
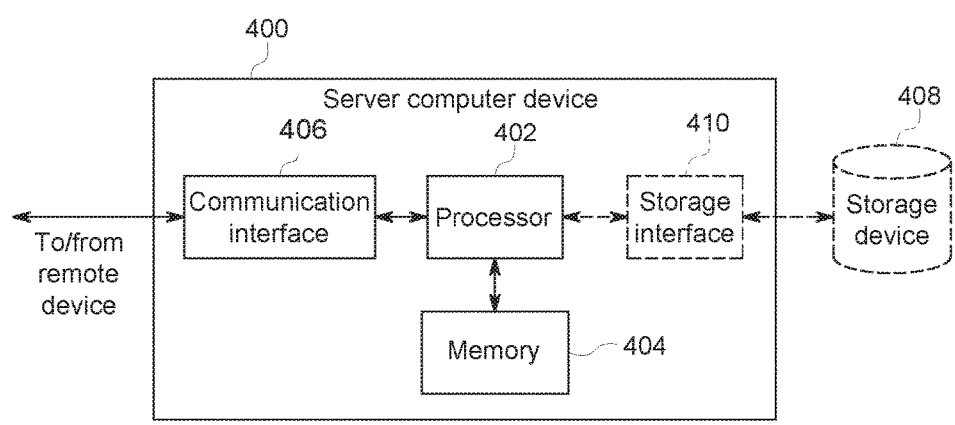
FIG. 5 is a schematic view of an exemplary configuration of a component wear monitoring computer device that may be used with the monitoring system shown in FIG. 3.

FIG. 5 is a schematic view of an exemplary configuration of CWM computer device 202 that may be used with the monitoring system 200 (both shown in FIG. 3). More specifically, server computer device 400 may include, but is not limited to, CWM computer device 202 and database server 212 (both shown in FIG. 3). Server computer device 400 also includes a processor 402 for executing instructions. Instructions may be stored in a memory area 404. Processor 402 may include one or more processing units (e.g., in a multi-core configuration).

Processor 402 is operatively coupled to a communication interface 406 such that server computer device 400 is capable of communicating with a remote device, such as another server computer device 400, imaging systems 210 (shown in FIG. 3), CWM computer device 202 (shown in FIG. 3), or client systems 204 (shown in FIG. 3). For example, communication interface 406 may receive requests from client systems 204, as illustrated in FIG. 3.

Processor 402 is also operatively coupled to a storage device 408. Storage device 408 is any computer-operated hardware suitable for storing and/or retrieving data, such as, but not limited to, data associated with database 214 (shown in FIG. 3). In some embodiments, storage device 408 is integrated in server computer device 400. For example, server computer device 400 may include one or more hard disk drives as storage device 408. In other embodiments, storage device 408 is external to server computer device 400 and is accessed by a plurality of server computer device 400. For example, storage device 408 may include a storage area network (SAN), a network attached storage (NAS) system, and/or multiple storage units such as hard disks and/or solid state disks in a redundant array of inexpensive disks (RAID) configuration.

In some embodiments, processor 402 is operatively coupled to storage device 408 via a storage interface 410. Storage interface 410 is any component capable of providing processor 402 with access to storage device 408. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 402 with access to storage device 408.

Processor 402 executes computer-executable instructions for implementing aspects of the disclosure. In some embodiments, the processor 402 is transformed into a special purpose microprocessor by executing computer-executable instructions or by otherwise being programmed. For example, the processor 402 is programmed with instructions as described further below.

Figure 6:
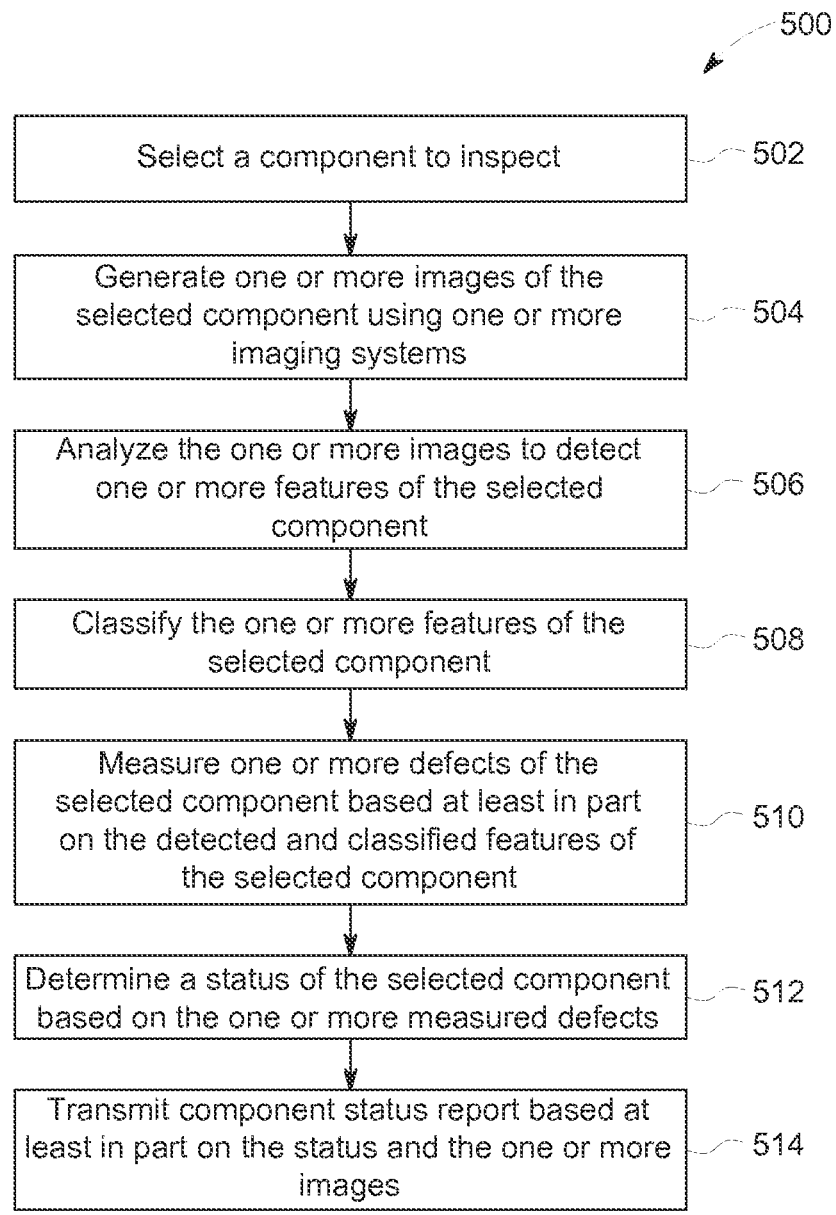
FIG. 6 is a flow chart of an exemplary process of inspecting a component using the monitoring system shown in FIG. 3.

FIG. 6 is a flow chart of an exemplary process 500 of inspecting a component using monitoring system 200 (shown in FIG. 3). In the exemplary embodiment, process 500 is performed by client system 204 (shown in FIG. 3).

Client system 204 selects 502 a component to inspect. In some embodiments, client system 204 receives the selection from user 302 (shown in FIG. 4). In other embodiments, client system 204 automatically selects 502 the component to inspect. For example, at an in-shop inspection location 206, client system 204 may have a plurality of components to inspect. In this example, client system 204 selects the next component in the pile. In one example, client system 204 has an algorithm that allows it to select 502 a component to inspect. In another example, at an on-site inspection location 208 receives images from a boroscope. In one example, client system 204 selects 502 a component to inspect based on the images from the boroscope and determines the component based on the received images. For example, client system 204 selects 502 an image based on the order that the images were received from the boroscope, based on client system's ability to determine the part number from the images, or any other selection methodology.

In one embodiment, client system 204 further includes robotic handler 211 (shown in FIG. 3) that is communicatively coupled to imaging system 210. In another embodiment, robotic handler 211 is communicatively coupled to client system 204. In such an example, robotic handler 211 is able to select 502 a component to inspect. The system may include imaging such that it selects the component and holds the component in the same manner and orientation thereby ensuring consistent imaging of the component. Robotic handler 211 can also coordinate with imaging system 210 (shown in FIG. 3) such that if the imaging detects a potential problems, robotic handler 211 can be instructed to orient the component for further imaging that can facilitate analysis. Such imaging and orienting can be done in real time. Robotic handler 211 can be stationary and perform pick and place functionality for the inspection. Alternatively, robotic handler 211 can be mobile such as autonomous guided vehicles that can select the component to be inspected and bring the component to imaging system 210. In a further embodiment, imaging system 210 and robotic handler 211 are integrated.

Client system 204 generates 504 one or more images of the selected component using one or more imaging systems 210 (shown in FIG. 3). Examples of imaging systems 210 include imaging devices capable of generating a photographic image, an ultrasound image, a 3D scan, an X-ray image, and a video. In the exemplary embodiment, imaging system 210 instructs robotic handler 211 to position the selected component relative to the imaging device and any lighting to ensure that each image is of the desired region of the component and at the proper resolution. Client system 204 analyzes 506 the one or more images to detect one or more anomalous features of the selected component. In the exemplary embodiment, the anomalous features include marks, discolorations, scratches, holes, rust marks, corrosion, wear marks, burrs, or other blemishes and potential defects of the selected component. Client system 204 classifies 508 each of the detected anomalous features. In some embodiments, client system 204 is configured to determine a rating for the one or more anomalous features based on one or more predetermined rules and a historical database of anomalous features. In some embodiment, client system 204 compares the one or more images of the selected component with stored images to determine the rating. In this step, client system 204 may classify some of the one or more features as defects. If this occurs, then client system 204 measures 510 the one or more defects to determine the defects size and shape.

Client system 204 determines 512 a status of the selected component based on the one or more measured defects and the one or more features. For example, client system 204 determines that the component is about to fail based on the defects. In this case, client system 204 notifies user 302 to replace the component. Client system 204 transmits 514 a component status report to CWM computer device 202 (shown in FIG. 3). The component status report includes information about the inspection. In the exemplary embodiment, the component status report includes a component identifier, one or more images of the component, a current lifetime of operation for the component, a location of the inspection, the status of the component, any recommended actions, data about the one or more measured defects and the one or more features (i.e., measurements), and other information from the inspection.

In some embodiments, client system 204 determines a maintenance action to take for the component and outputs that maintenance action to the user. For example, the maintenance action may include, but is not limited to, replacing the component or performing repairs on the component.

Figure 7:
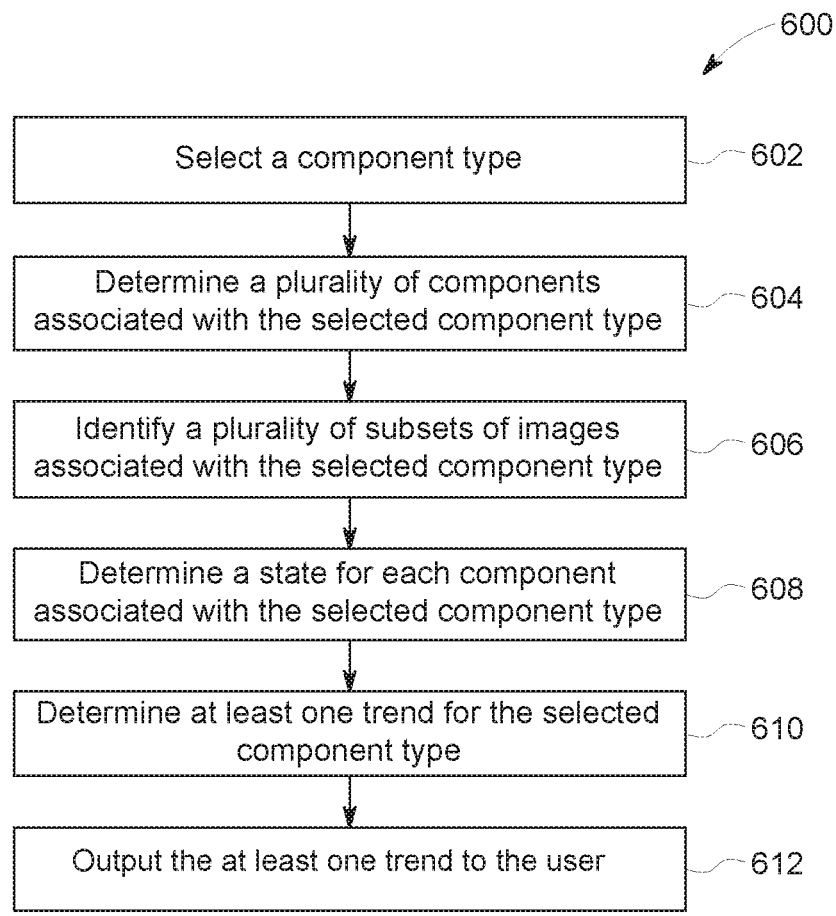
FIG. 7 is a flow chart of an exemplary process of determining a trend of component wear using the monitoring system shown in FIG. 3.

FIG. 7 is a flow chart of an exemplary process 600 of determining a trend of component wear using monitoring system 200 (shown in FIG. 3). In the exemplary embodiment, process 600 is performed by CWM computer device 202 (shown in FIG. 3).

CWM computer device 202 selects 602 a component type. Each component is included in a component type. For example, component types for gas turbine engine 100 include, but are not limited to, compressor blade assembly 128 and turbine bucket 132 (all shown in FIG. 1). In an additional example, component types for jet turbine engine 150 include, but are not limited to, fan blades 164 (all shown in FIG. 2). In the exemplary embodiment, CWM computer device receives a selection of a component type from a user, such as user 302 (shown in FIG. 4). CWM computer device 202 determines 604 a plurality of components that are associated with the selected component type. CWM computer device 202 identifies 606 a plurality of subsets of images associated with the selected component type. Each subset of images is associated with a component that is of the selected type. And each subset of images is of the associated component, where some of the images in the subset of images are of the component at different angles and some of the images are of the component at different points in the component's lifecycle.

CWM computer device 202 determines 608 a state for each component associated with the selected component type. For example, CWM computer device 202 compares a subset of images and determines that the component had a 2 cm crack before the component was replaced. CWM computer device 202 determines 610 at least one trend based at least in part on the plurality of determined states of the plurality of components. In one embodiment, the at least one trend is related to the operational lifecycle of the component type. For example, one of the trends indicates that this component type has a tendency to develop a hairline fracture at a certain location after 20,000 hours of operation. The manufacturer of the component can then use this information to redesign the part. Inspectors and maintenance workers can use that trend to guide their inspections of other components of that component type. For example, the component may be inspected once every 5,000 hours, except after 15,000 hours, that component is inspected every 2,000 hours. CWM computer device 202 outputs 612 the at least one trend to the user. In the exemplary embodiment, the determined at least one trend instructs the user to initiate a logistics process to modify a maintenance plan for at least one component. For example, the user may modify the maintenance plan to increase or decrease the amount of time between inspections. Other examples of the logistical process includes, but is not limited to, doing nothing, performing other modifications to the maintenance plan, rejecting and replacing the component, and performing inspections of other components of the associated device.

Figure 8:
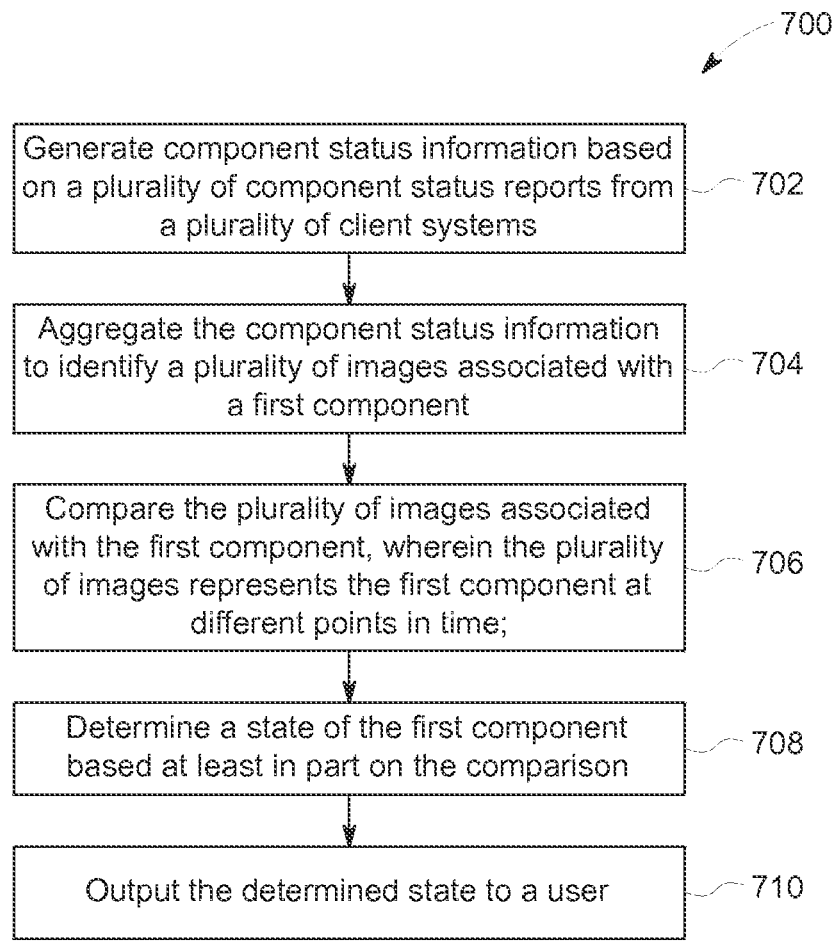
FIG. 8 is a flow chart of an exemplary process of determining a status of a component using the monitoring system shown in FIG. 3.

FIG. 8 is a flow chart of an exemplary process 700 of determining a status of a component using monitoring system 200 (shown in FIG. 3). In the exemplary embodiment, process 700 is performed by CWM computer device 202 (shown in FIG. 3).

In the exemplary embodiment, CWM computer device 202 generates 702 component status information based on a plurality of component status reports from a plurality of client systems 204 (shown in FIG. 3). As described above, in the exemplary embodiment each component status report includes a component identifier and at least one image of the component associated with the component identifier. CWM computer device 202 receives the component status reports for the different components from client systems 204. In some embodiments, CWM computer device 202 receives a first component status report about a first component at a first point in time. Then CWM computer device 202 receives a second component status report about the first component at a second point in time. In the example embodiment, the second period of time is after the first period of time. In some embodiments, the first component status report is received from a first client system 204 and the second component status report is received from a second client system 204. In other embodiments, the first and second component status reports are received from the same client system 204. CWM computer device 202 associates the first component status report with the second component status report, based at least in part on the component identifier. In a first example, component A is inspected at a first on-site inspection location 208 (shown in FIG. 3) in New York. First on-site inspection location 208 generates a component status report and transmits to the component status report to CWM computer device 202. Later component A is inspected at a second on-site inspection location 208 in California. The second on-site inspection location 208 generates a component status report about component A and transmits the component status report to CWM computer device 202. CWM computer device 202 determines that the two reports both relate to the component A and associates them with each other in the component status information. In the exemplary embodiment, the complete component status reports are stored in the component status information. In other embodiments, the component status reports are aggregated and the data is separated out of each component status report to generate a data entry for each component. As additional component status reports are received for each component, then the data entry associated with that component is updated with the information in the new component status report.

CWM computer device 202 aggregates 704 the component status information to determine a plurality of images associated with a first component based at least in part on the component identifier. CWM computer device 202 compares 706 the plurality of images associated with the first component. The plurality of images represents the first component at different points in time. CWM computer device 202 determines 708 a state of the first component based at least in part on the comparison. CWM computer device 202 outputs 710 the determined state to a user, such as user 302 (shown in FIG. 4). In the exemplary embodiment, the determined state of the first component instructs the user to initiate a logistics process to modify a maintenance plan for the first component. For example, the user may replace the component based on the determined state. In another example, the user may determine to modify the maintenance plan to increase or decrease the amount of time between inspections. Other examples of the logistical process includes, but is not limited to, doing nothing, performing other modifications to the maintenance plan, rejecting and replacing the component, and performing inspections of other components of the associated device.

Figure 9:
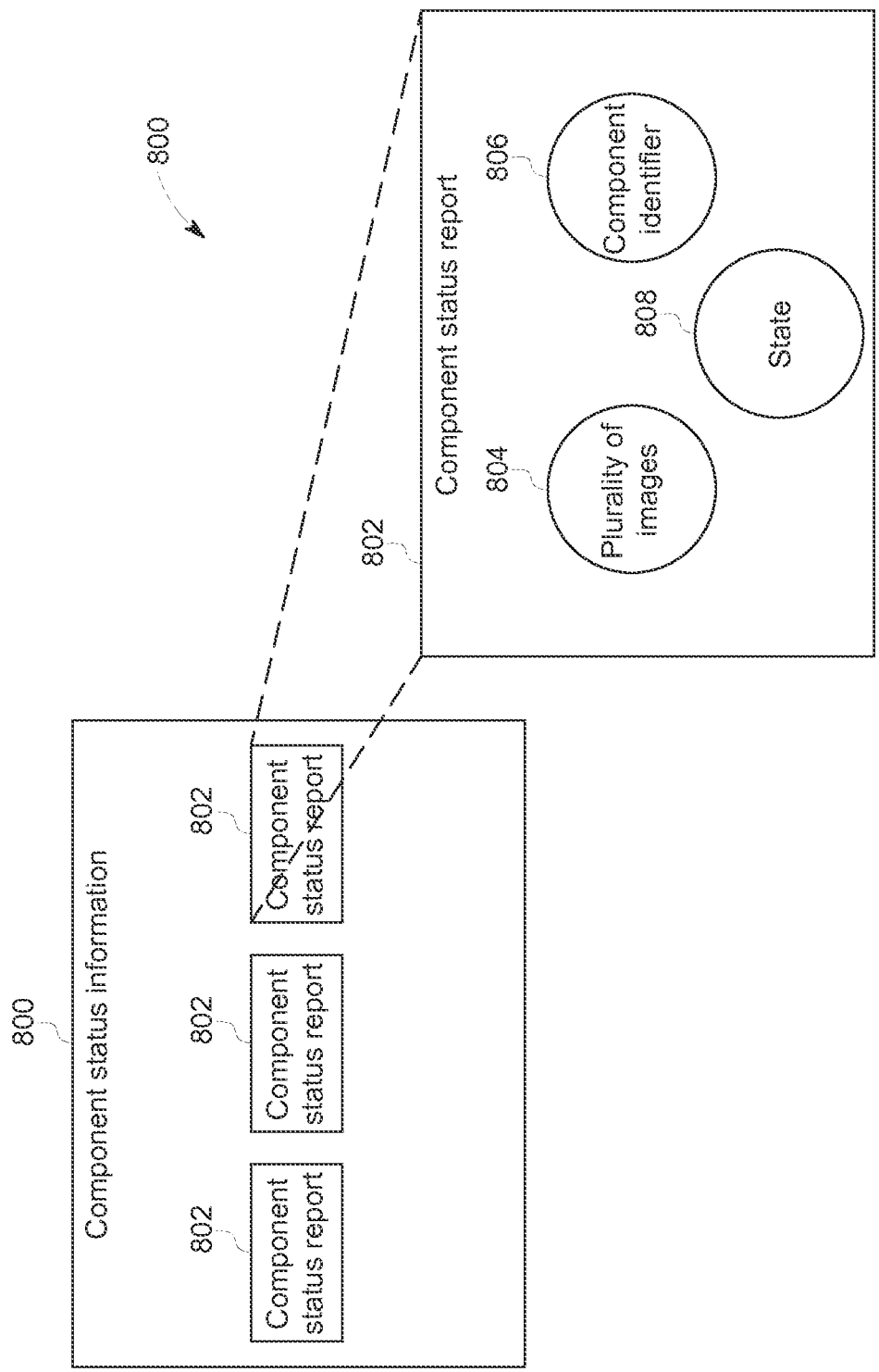
FIG. 9 is a schematic view of exemplary component status information that may be used with monitoring system shown in FIG. 3.

FIG. 9 is a schematic view of exemplary component status information 800 that may be used with monitoring system 200 (shown in FIG. 3). In the exemplary embodiment, component status information 800 is stored on database 214 and accessed by CWM computer device 202 (both shown in FIG. 3). Component status information 800 includes a plurality of component status reports 802. In the exemplary embodiment, each component status report 802 is associated with a component and is received from client system 204 (shown in FIG. 3). Some component status reports 802 may be associated with the same component, where each component status report 802 is associated with a different point in time of the component's operational lifetime.

In the exemplary embodiment, component status report 802 includes a plurality of images 804, a component identifier 806, and a state 808 of the associated component. In the exemplary embodiment, plurality of images 804 is of different views of the component associated component. Plurality of images 804 were generated by imaging systems 210 (shown in FIG. 3). Component identifier 806 uniquely identifies the associated component. In some embodiments, state 808 is the state of the associated component as determined in Step 708 (shown in FIG. 8). In other embodiments, state 808 is the status of the first component as determined in Step 512 of FIG. 6.

The above-described method and system provide for accurate prediction of the lifetime of components. Furthermore, the method and systems described herein allow for and accurate prediction of potential failure points of those components. Also, the system and methods described herein are not limited to any single predefined component, but may be implemented with any component of a device that is subject to wear. For example, the method and systems described herein may be used with components of aircraft, energy generating turbines, automobiles, and other devices where components show wear. By aggregating the data about the lifecycle of a plurality of components of the same type operating lifetimes and maintenance schedules may be more accurately generated. Furthermore, by aggregating the status data and images of a plurality of components of the same type over time, trends of wear may be identified.

An exemplary technical effect of the methods, systems, and apparatus described herein includes at least one of: (a) generating component status information based on a plurality of component status reports from a plurality of client systems; (b) aggregating the component status information to identify a plurality of images associated with a first component based at least in part on the component identifier; (c) comparing the plurality of images associated with the first component; and (d) determining a state of the first component based at least in part on the comparison.

Another exemplary technical effect of the methods, systems, and apparatus described herein includes at least one of: (a) identifying a plurality of subsets of images based at least in part on the component identifier, where each subset of images of the plurality of subsets of images associated with a component of a subset of components; (b) comparing each subset of images to determine a state for the corresponding component; and (c) determining at least one trend based at least in part on the plurality of states associated with the subset of components.

Exemplary embodiments of method and systems for monitoring a dynamic system are described above in detail. The method and systems described herein are not limited to the specific embodiments described herein, but rather, components of systems or steps of the methods may be utilized independently and separately from other components or steps described herein. For example, the methods may also be used in combination with multiple imaging systems, and are not limited to practice with only imaging systems as described herein. Additionally, the methods may also be used with other components of devices, and are not limited to practice with only the components as described herein. Rather, the exemplary embodiments may be implemented and utilized in connection with many other devices that have components with operations lifetimes that need to be replaced over time.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for monitoring a plurality of components, said monitoring system comprising:
    a plurality of client systems, each client system of said plurality of client systems associated with at least one imaging device, said plurality of client systems configured to generate a plurality of component status reports, wherein the plurality of component status reports is associated with the plurality of components, wherein each component of the plurality of components is associated with a unique component identifier, and wherein each of the plurality of component status reports includes the corresponding component identifier and at least one image of the corresponding component; and
    a component wear monitoring ("CWM") computer device in communication with said plurality of client systems, wherein said CWM computer device includes a memory, said CWM computer device configured to:
        receive the plurality of component status reports from said plurality of client systems;
        generate component status information based on the plurality of component status reports;
        aggregate the component status information to identify a plurality of images included in the component status information and associated with a first component of the plurality of components based at least in part on the component identifier associated with the first component;
        compare the plurality of images associated with the first component, wherein the plurality of images represents the first component at different points in time;
        determine a state of the first component based at least in part on the comparison; and
        replace or repair the first component based on the determined state of the first component.

2. The monitoring system in accordance with claim 1, wherein said CWM computer device is further configured to:
    determine a subset of components of the plurality of components based on the component status information;
    identify a plurality of subsets of images associated with the subset of components, wherein each subset of images of the plurality of subsets of images is associated with a respective component of the subset of components;
    determine a plurality of states for the plurality of components based at least in part on the subset of images associated with each respective component of the subset of components;
    determine at least one trend based at least in part on the plurality of states associated with the subset of components; and
    output the determined at least one trend to the user.

3. The monitoring system in accordance with claim 2, wherein the component status information also includes a component type, and wherein said CWM computer device is further configured to determine the subset of components from the plurality of components based at least in part on the component type.

4. The monitoring system in accordance with claim 2, wherein said CWM computer device is further configured to determine the plurality of states for the plurality of components at least in part by comparing the plurality of images to at least one predetermined trend.

5. The monitoring system in accordance with claim 4, wherein said CWM computer device is further configured to:
    determine whether the plurality of images matches the at least one trend based at least in part on the comparison; and
    determine a remaining lifetime of the first component based at least in part on the determination.

6. The monitoring system in accordance with claim 1, wherein the at least one image includes at least one of a photographic image, an ultrasound image, a 3D scan, an X-ray image, and a video.

7. The monitoring system in accordance with claim 1, wherein said CWM computer device is further configured to:
    receive a first component status report for the first component at a first point in time from a first client system of said plurality of client systems at a first location;
    receive a second component status report for the first component at a second point in time from a second client system of said plurality of client systems at a second location, wherein the first location and the second location are different and the second point in time is after the first point in time;
    associate the first component status report with the second component status report based at least in part on the component identifier associated with the first component; and
    generate component status information for the first component based at least in part on the first component status report and the second component status report.

8. The monitoring system in accordance with claim 1, wherein a first client system of said plurality of client systems is further configured to:
    determine the component identifier for the first component;

generate one or more images of the first component using the at least one imaging device;

determine a status of the first component based at least in part on the one or more images of the first component;

generate a component status report for the first component based at least in part on the determined status, the component identifier, and the one or more images; and transmit the generated component status report to said CWM computer device.

9. The monitoring system in accordance with claim 8, wherein said first client system is further configured to:

detect at least one anomalous feature of the first component based at least in part on the one or more images of the first component; and determine a rating for the at least one anomalous feature based on at least one rule and a historical database of anomalous features.

10. The monitoring system in accordance with claim 9, wherein said first client system is further configured to:

determine a maintenance action based at least in part on the rating; and output the determined maintenance action to the user.

11. The monitoring system in accordance with claim 8, wherein said first client system is further configured to:

compare the one or more images of the first component to a database of anomalous features; and determine a rating for the first component based on the comparison.

12. The monitoring system in accordance with claim 8, wherein the first client system is further configured to:

determine at least one measurement of at least one defect of the first component; and generate the component status report further based on at least one defect.

13. The monitoring system in accordance with claim 1, wherein the component status information includes at least a plurality of measurements of the first component based on one or more component status reports associated with the first component.

14. The monitoring system in accordance with claim 1, wherein the determined state of the first component instructs the user to initiate a logistics process, and wherein the logistics process includes at least one of modifying a maintenance plan for the first component, performing no additional action, replacing the first component, and inspecting a second component of the plurality of components.

15. The monitoring system in accordance with claim 1, wherein each client system of said plurality of client systems includes a robotic handler which positions the first component relative to the at least one imaging device for capturing images of the first component at different angles.

16. The monitoring system in accordance with claim 1, the plurality of client systems is located at a plurality of locations, wherein the plurality of locations includes an on-site inspection location and an in-shop inspection location.

17. The monitoring system in accordance with claim 2, wherein some of the images in the subset of images are of the component at different points in the component's lifecycle.

18. A component wear monitoring ("CWM") computer device including a processor and at least one memory device, wherein said processor is in communication with said at least one memory device, said CWM computer device configured to:

receive a plurality of component status reports from a plurality of client systems, wherein the plurality of component status reports is associated with a plurality of components, wherein each component of the plurality of components is associated with a unique component identifier, and wherein each of the plurality of component status reports includes the corresponding component identifier and at least one image of the corresponding component;

generate component status information based on the plurality of component status reports;

aggregate the component status information to identify a plurality of images included in the component status information and associated with a first component of the plurality of components based at least in part on the component identifier associated with the first component;

compare the plurality of images associated with the first component, wherein the plurality of images represents the first component at different points in time;

determine a state of the first component based at least in part on the comparison; and replace or repair the first component based on the determined state of the first component.

19. The CWM computer device in accordance with claim 18, further configured to:

determine a subset of components of the plurality of components based on the component status information;

identify a plurality of subsets of images associated with the subset of components, wherein each subset of images of the plurality of subsets of images is associated with a respective component of the subset of components;

determine a plurality of states for the plurality of components based at least in part on the subset of images associated with each respective component of the subset of components;

determine at least one trend based at least in part on the plurality of states associated with the subset of components; and output the determined at least one trend to the user.

20. The CWM computer device in accordance with claim 19, wherein the component status information also includes a component type, and wherein said CWM computer device is further configured to determine the subset of components from the plurality of components based at least in part on the component type.

21. The CWM computer device in accordance with claim 18 further configured to determine the plurality of states for the plurality of components at least in part by comparing the plurality of images to at least one predetermined trend.

22. The CWM computer device in accordance with claim 21, further configured to:

determine whether the plurality of images matches the at least one trend based at least in part on the comparison; and determine a remaining lifetime of the first component based at least in part on the determination.

23. The CWM computer device in accordance with claim 18, wherein the at least one image includes at least one of a photographic image, an ultrasound image, a 3D scan, an X-ray image, and a video.

24. The CWM computer device in accordance with claim 18, further configured to:

receive a first component status report for the first component at a first point in time from a first client system of the plurality of client systems at a first location;

receive a second component status report for the first component at a second point in time from a second client system of the plurality of client systems at a second location, wherein the first location and the second location are different and the second point in time is after the first point in time;

associate the first component status report with the second component status report based at least in part on the component identifier associated with the first component; and generate component status information for the first component based at least in part on the first component status report and the second component status report.

25. A method for detecting component wear, said method implemented using a component wear monitoring ("CWM") computer device including a processor and at least one memory device, said method comprising:

receiving a plurality of component status reports from a plurality of client systems, wherein the plurality of component status reports is associated with a plurality of components, wherein each component of the plurality of components is associated with a unique component identifier, and wherein each of the plurality of component status reports includes the corresponding component identifier and at least one image of the corresponding component;

generating component status information based on the plurality of component status reports;

aggregating, by the CWM computer device, the component status information to identify a plurality of images included in the component status information and associated with a first component of the plurality of components based at least in part on the component identifier associated with the first component;

comparing, by the CWM computer device, the plurality of images associated with the first component, wherein the plurality of images represents the first component at different points in time;

determining, by the CWM computer device, a state of the first component based at least in part on the comparison; and replace or repair the first component based on the determined state of the first component.

26. The method in accordance with claim 25, further comprising:

determining a subset of components of the plurality of components based on the component status information;

identifying a plurality of subsets of images associated with the subset of components, wherein each subset of images of the plurality of subsets of images is associated with a respective component of the subset of components;

determining a plurality of states for the plurality of components based at least in part on the subset of images associated with each respective component of the subset of components;

determining at least one trend based at least in part on the plurality of states associated with the subset of components; and outputting the determined at least one trend to the user.

* * * * *